United States Patent
Stransky-Heilkron et al.

(10) Patent No.: US 11,924,494 B2
(45) Date of Patent: Mar. 5, 2024

(54) METHOD AND DEVICE FOR IDENTIFYING A PERIPHERAL DEVICE FROM A DIGITAL CONTENT

(71) Applicant: NAGRAVISION S.A., Cheseaux-sur-Lausanne (CH)

(72) Inventors: Philippe Stransky-Heilkron, Cheseaux-sur-Lausanne (CH); Frederic Thomas, Onex (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

(21) Appl. No.: 17/444,708

(22) Filed: Aug. 9, 2021

(65) Prior Publication Data
US 2022/0150565 A1    May 12, 2022

Related U.S. Application Data

(63) Continuation of application No. 16/077,297, filed as application No. PCT/EP2017/052800 on Feb. 9, 2017, now Pat. No. 11,115,700.

(30) Foreign Application Priority Data

Feb. 12, 2016 (EP) .................................... 16155575

(51) Int. Cl.
*H04N 21/41* (2011.01)
*H04N 21/436* (2011.01)
(Continued)

(52) U.S. Cl.
CPC ....... *H04N 21/4108* (2013.01); *H04N 21/436* (2013.01); *H04N 21/43635* (2013.01); *H04N 21/8358* (2013.01)

(58) Field of Classification Search
CPC ......... H04N 21/44008; H04N 21/8358; H04N 21/4181; H04N 19/46; H04N 19/467; H04N 21/2541; H04N 7/1675
See application file for complete search history.

(56) References Cited

U.S. PATENT DOCUMENTS 8,489,882 B2* 7/2013 Killian .................. G06F 21/645
                                                    713/176
2001/0044899 A1* 11/2001 Levy ...................... G06K 19/18
                                                    713/176
(Continued)

FOREIGN PATENT DOCUMENTS

| CN | 104598782 A | 5/2015 |
|---|---|---|
| EP | 2 490 446 | 8/2012 |
| FR | 2 811 503 | 1/2002 |

OTHER PUBLICATIONS

TechTarget Contributor, Definition: Real-Time Clock (RTC), 2005, WhatIs.com, p. 1 (Year: 2005).*

(Continued)

*Primary Examiner* — Jason Salce
(74) *Attorney, Agent, or Firm* — Oblon, McClelland, Maier & Neustadt, L.L.P.

(57) ABSTRACT

A method for identifying a peripheral device from a digital content having been received by said peripheral device from a master device located at a user end is described. The master device can be connected to a server located at a back end, and the method includes receiving, by the master device from the peripheral device, at least peripheral identification data. The method also includes generating, at the master device, a first mark as a function of at least a part of the peripheral identification data, and watermarking the digital content using the first mark before transmitting the digital content to the peripheral device.

16 Claims, 3 Drawing Sheets

(51) Int. Cl.
*H04N 21/4363* (2011.01)
*H04N 21/8358* (2011.01)

(56) References Cited

U.S. PATENT DOCUMENTS

| | | |
|---|---|---|
| 2002/0114458 A1 | 8/2002 | Belenko et al. |
| 2002/0181705 A1 | 12/2002 | Sako |
| 2003/0009669 A1 | 1/2003 | White et al. |
| 2003/0138127 A1* | 7/2003 | Miller ............... B42D 25/333 375/E7.076 |
| 2006/0010500 A1 | 1/2006 | Elazar et al. |
| 2011/0170688 A1 | 7/2011 | Evans et al. |
| 2011/0314511 A1 | 12/2011 | Hartung et al. |
| 2012/0207342 A1 | 8/2012 | Quail |
| 2013/0223671 A1 | 8/2013 | Jin et al. |
| 2013/0268980 A1 | 10/2013 | Russell |
| 2013/0297737 A1 | 11/2013 | Wajs et al. |
| 2015/0302033 A1 | 10/2015 | Jarnikov |
| 2017/0171615 A1* | 6/2017 | Xiang ..................... G06F 21/00 |

OTHER PUBLICATIONS

Cypress Perform, Real-Time Clock (RTC), Cypress Semiconductor Corp., 1.80, pp. 1-26 (Year: 2012).*
Endian First Examination Report dated Jul. 15, 2020 in Indian Application No. 201827021595.
Combined Chinese Office Action and Search Report dated Mar. 24, 2020, in Patent Application No. 201780007693.9, 19 pages (with English translation).
Chinese Office Action dated Sep. 16, 2020 in Chinese Application No. 201780007693.9 (with Computer Generated Engiish Transiation).
International Search Report issued in International Application No. PCT/EP2017/052800 dated Mar. 23, 2017.

\* cited by examiner

METHOD AND DEVICE FOR IDENTIFYING A PERIPHERAL DEVICE FROM A DIGITAL CONTENT

CROSS REFERENCE TO RELATED APPLICATIONS

This application is a Continuation of U.S. application Ser. No. 16/077,297, filed Aug. 10, 2018, which is a U.S. National Stage Application of International Application No. PCT/EP2017/052800 filed Feb. 9, 2017, which claims priority from European Patent Application No. 16155575.0 filed Feb. 12, 2016.

BACKGROUND

In the Pay-TV field, content owners have an interest that Pay-TV operators use enhanced receivers able to watermark digital content received from a content provider with a unique device or customer mark. Such receivers are commonly known as set-top-boxes (STB), or integrated receiver decoders (IRD), located on the end-user side. For receiving digital content, such as audio, audio-video or multimedia content, the receiver is connected to a remote server through an IP data link, a satellite data link, terrestrial antennas or cables data link. The remote server acts as a content provider and can be also referred as head-end located at a back end, by contrast with the end-user area where the receiver is located.

The receiver is mainly used for extending the capabilities of the playing device, such as a television, an audio system, a game console or any multimedia system. For example, the receiver may provide decryption of the content if this content is encrypted when it is received from the remote server, it may manage the access rights to the content and it may decode the content since it is generally received in a compressed form. The receiver can also propose storage capabilities, parental control with identification of the user to apply an appropriate profile, an electronic program guide and many other functions to enhance the end-user multimedia experience and taking advantage of multimedia content.

Once the content is received by the receiver, it can be copied so as to make permanent private copies that can be shared with other consumers. If sharing these copies is a feature highly demanded by the digital TV subscribers, these new services must guarantee the rights granted by the content owners or the content providers and must prevent any illegal usage.

Located at the heart of modern receivers, the chipset implements a so-called Secure Video Path, so the content remains in safe place inside the chipset. However, once the content is leaving the chipset, e.g. in order to be transmitted to the playing device, the control of its usage remains difficult.

When the playing device is connected to the receiver with a common communication link, such as an HDMI cable (NOMI stands for High Definition Multimedia Interface), the digital content is protected by a communication protocol, such as HDCP (High-Bandwidth Digital Content Protection), which defines the frame of data exchange. The HDCP protocol is based on certificates verification and data encryption. Before the digital content is outputted by a set-top-box, a handshake is initiated during which certificates of the set-top-box and the playing device are exchanged. These certificates (e.g. X509) are then verified and used to establish a common encryption key. The protection of the digital content is obtained by adding an encryption layer onto the content stream which carries the digital content from the receiver to the playing device. To get access to the content, this protection is removed by the recipient at the end of the communication link. In the case where the recipient is not a simple playing device (e.g. a television) or in the case where the recipient is an illegal intermediate device that could be used to perform a "man-in-the middle" attack, there is no mean to control the leak of the digital content towards unauthorized playing device.

It is known to supply the set-top-box with a digital content that has been previously watermarked by the content provider (server) using an identifier of the set-top-box. According to another embodiment, the watermarking of the digital content is performed by the set-top-box, using its identifier as a mark applied on the digital content received from the content provider. Such a solution allows to identify if the digital content played at an end-user is legal or not. Indeed, if the digital content does not comprise the mark of the set-top-box, the content can be regarded as being illegally used by the end-user.

The responsibility of the content providers or the Pay-TV operators is often implicated due to the fact that the content has leaked downstream of their devices. Therefore, negative impacts are potentially numerous and range from wasted time spent for investigating the leakage until the breach of contracts by content owners invoking the inability of the Pay-TV operator to plug the leak whereas they are in fact powerless. Furthermore, this issue affects the value of watermarking capabilities in Pay-TV receivers.

Therefore, there is a need to suggest means to overcome, at least in part, the aforementioned concerns.

SUMMARY

To address these concerns, the present description suggests a solution for assisting in identification of a peripheral device from a digital content which has been received by this peripheral device from the aforementioned receiver (STB IRD) located at the user end.

With respect to such a receiver (STB/IRD), it should be noted that a television, a splitter or any other device suitable to receive the digital content from the receiver can be regarded as a peripheral device of this receiver. To avoid any misunderstanding, the above-mentioned receiver (STB/IRD) is referred as a master device in the present description and any device of the end-user connected to the master device is referred as a peripheral device. Accordingly, there is also a clear distinction between the end-user area, where are located both the master device and any peripheral device, and the back end which refers to the server side. The back end is the area where the remote server is located, namely the area from which the digital content is received by the master device from the content provider. The server side and the end-user side are linked together for example by an IP or satellite data link, a terrestrial wireless communication means (antenna) or a cable data link.

According to a first aspect, the aforementioned solution relates to a method for identifying a peripheral device from a digital content having been received by said peripheral device from a master device. This master device is located on an end-user side and is configured to be connected to a server located on the server side (back end). Accordingly, this server can be regarded as being a remote server such as a remote content provider or a head-end.

The method comprises the steps of:

receiving, by the master device from the peripheral device, at least peripheral identification data pertaining to the peripheral device;

generating, at the master device, a first mark as a function of at least a part of said peripheral identification data; and watermarking said digital content using the first mark before transmitting the digital content to the peripheral device.

According to a second aspect, the aforementioned solution relates to a master device configured to transmit a digital content to a peripheral device. As with the above-mentioned method, the master device is located at a user end and is configured to be connected to a server located at a back end. The master device comprises a data interface configured to receive, from said peripheral device, at least peripheral identification data pertaining to the peripheral device. In addition, the master device comprises:

a mark generator configured to generate a first mark as a function of at least a part of said peripheral identification data;

a watermarking unit configured to watermark said digital content using the first mark, and a controller (e.g. a processing unit) configured to instruct the watermarking unit to watermark said digital content before transmitting it to the peripheral device.

Given that the digital content is watermarked by the master device using a mark which is at least derived from peripheral identification data, and given that this watermarking operation is performed by the master device before the delivery of the digital content to the peripheral device, therefore the present solution provides means to identify such a peripheral device from any digital content having been received by this peripheral device or having been passed through this peripheral device. Thus, from a shared digital content, it becomes possible to identify the source of the leak, namely to identify from which device or which customer the digital content left the circuit of legal usages. Accordingly, this solution can be used as a means to assist investigations for finding the source of the leakage and sanctioning malicious persons wanting to get digital content for free in illegal conditions. This solution may be also used to deploy technical measures designed to prevent further content leaks from a peripheral device that has already been identified as a source of leakage.

Advantageously, this solution can leverage of information exchanged between the master device and any peripheral device when these two devices are connected together according to any standard or proprietary communication protocol involving means for identifying devices and/or means for addressing devices. Such standards or protocols can refer for example to proprietary audio/video interfaces (e.g. HDMI), to the HDCP pairing protocol or to DTCP technology (Digital Transmission Content Protection).

Other embodiments and advantages will be presented in the following detailed description.

BRIEF DESCRIPTION OF THE DRAWINGS

The following detailed description will be better understood with reference to the attached figures in which.

DETAILED DESCRIPTION

Overview of the General Environment

Figure 1:
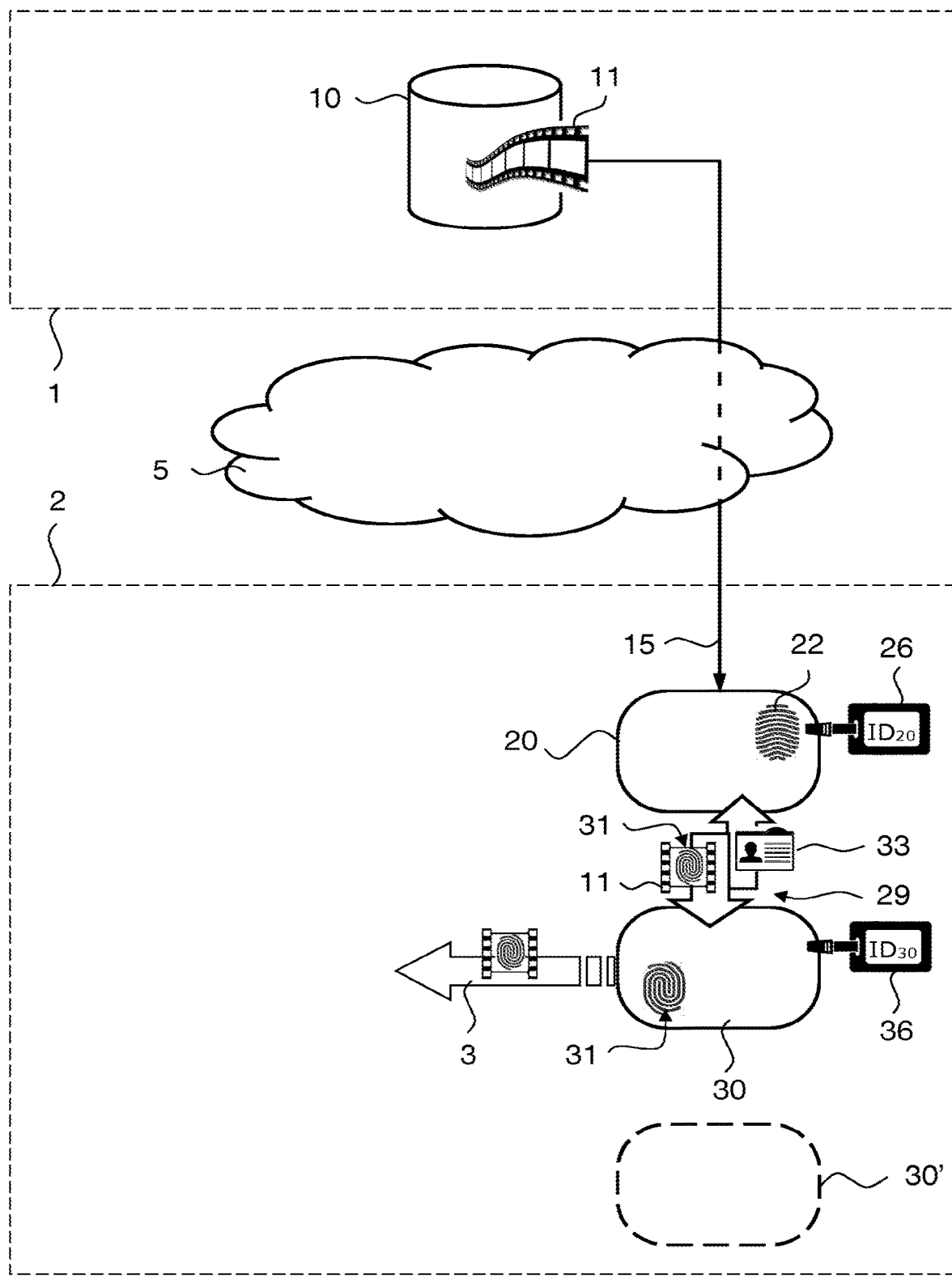
FIG. 1 schematically depicts a first main embodiment of the solution suggested in the present description.

FIG. 1 schematically shows an overview of the main entities together with areas and connections involved in the present solution. In this Figure, two main areas are shown by rectangles in dashed line. The first rectangle represents a server side 1, namely the area where a remote server or content provider such as a head-end is located. The second rectangle represents the end-user side 2, namely the area where the end-user is located. Accordingly, the server side 1 can be regarded as a back end with respect to the end-user side 2. These two areas 1 and 2 are linked together by a communication means 5 which is schematically shown by a cloud in this Figure. This communication means 5 may be achieved using any type of data link, such as an IP link, a satellite link, a terrestrial wireless link (antenna) or using any cable link for instance.

On the server side 1 is a server 10 whose main role is to provide a digital content 11 which is then transmitted to the end-user side 2 through the communication means 5. On the end-user side 2, there is a master device 20, for example a STB or an IRD. Still on the end-user side 2, this Figure shows a peripheral device 30 which is connected to the master 20 through a so-called local data link 29 which is schematically shown by a bidirectional arrow. The peripheral device 30 represents any device connectable to the master device 20.

The digital content 11 may be received by the master device 20 thanks to an input link 15 through the communication means 5. The digital content 11 may be of any type and may be supplied by the server 10 in any form and any manner. For example, the digital content can relate to a TV or a radio program, a movie, a game, information of any nature transmitted through an audio, video or audio and video stream. Such a stream may be multiplexed within a transport stream for example. It may be delivered in a compressed or uncompressed form, in a clear or encrypted form. In addition, it may be delivered together with metadata and/or control messages, such as ECM (Entitlement Control message) and/or EMM (Entitlement Management Message). The digital content 11 may be addressed to the end-users through any routing schemes, such as broadcast, multicast, unicast (i.e. on-demand), anycast or geocast schemes.

First Main Embodiment of the Method

According to a first aspect, the present solution relates to a method for identifying the peripheral device 30, or at least assisting in identification of this peripheral device 30, from the digital content 11 which has been received by the peripheral device 30 from the master device 20. To this end and in accordance with a first embodiment shown in FIG. 1, the method comprises at least the following steps:

Firstly, the master device 20 receives from the peripheral device 30, at least peripheral identification data 33 pertaining to the peripheral device 30. In FIG. 1, such peripheral identification data 33 are schematically shown by an identification badge.

Then, the master device 20 generates a first mark 31 as a function of at least a part of said peripheral identification data 33. This first mark 31 is schematically shown in FIG. 1 by a finger print which is assigned to the peripheral device 30.

Finally, the master device 20 uses the first mark 31 for watermarking the digital content 11 before transmitting this digital content to the peripheral device 30. In FIG. 1, the transmission of the watermarked digital content 11 is illustrated on the left side of the bidirectional arrow 29.

Accordingly, any digital content received by the peripheral device is watermarked using a first mark based on peripheral identification data. In other words, the peripheral device can be regarded as a slave device given that it has no choice but to receive content that is already marked using at least a data issued or derived from its peripheral identification data. If the peripheral identification data 33 are not received by the master device, the latter will be unable to watermark the digital content 11 and no content will delivered to the peripheral device from the master device.

In FIG. 1, the peripheral device 30 may be a multimedia device (e.g. a television, an audio system, a game console) or may be an intermediated device located between the master device 20 and the final playing device 30'. Such an intermediated device can refers to a splitter (HD splitter), a man-in-the-middle device, a module used to transform a digital signal into an analog signal for old audio/video device, or any other device through which the digital content may pass.

In any cases, if the digital content leaks through the peripheral device 30, as shown by the arrow 3 in FIG. 1, this digital content will be marked with the first mark 33 assigned to the peripheral device 30. Accordingly, it becomes possible to identify from which peripheral device (or from which kind of peripheral device) the digital content was leaked. Such information may then be used to prove that the responsibility of the content providers (or Pay-TV operators) which provide such master devices 20 is not engaged.

Second Main Embodiment of the Method

Figure 2:
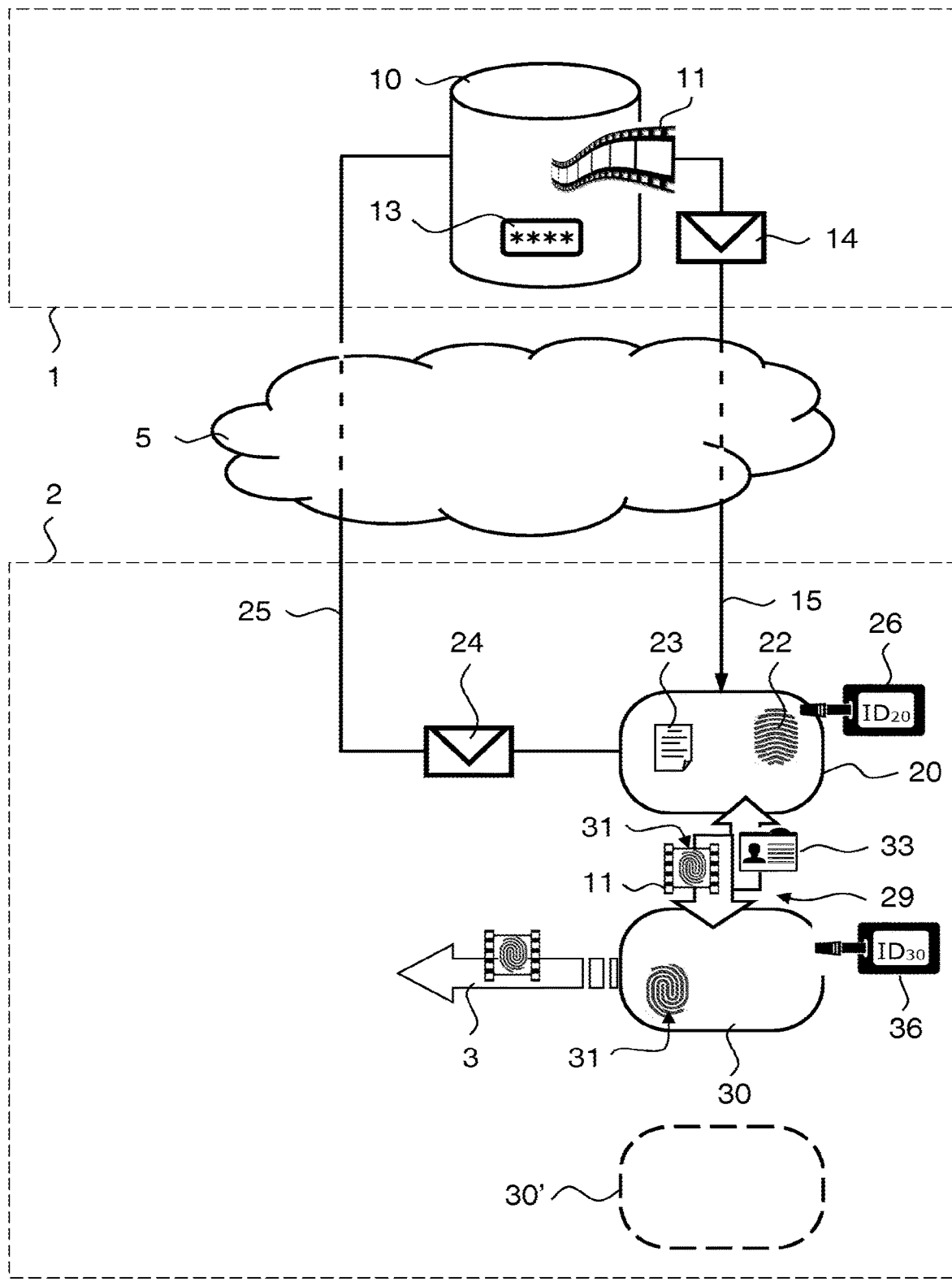
FIG. 2 schematically depicts a second main embodiment of the solution suggested in the present description.

The second main embodiment is shown in FIG. 2. This Figure illustrates a variant of the base solution depicted in FIG. 1. Compared to FIG. 1, this second Figure further shows a return path 25 which allows to sent information from the master device 20 to the server 10 or to any other server located on the server side 1. Such an extra server may be useful in particular if the server 10 is not configured for receiving or processing information from such a return path. For the sake of simplification, the present description will consider that the server to which the return path is connected is the same as that which provide the digital content 11 to the master device 20.

According to this second main embodiment, the method further comprises the following features:

The master device 20 generates event data 23. Such event data comprise at least a master device identifier 26 and at least a part of the aforementioned peripheral identification data 33. Event data 23 can be regarded as entries, such as those written in a log file. Preferably, event data 23 further comprise information specific to the transaction, for example time reference (e.g. date and time), proof of purchase, transaction number, etc.

Once generated, event data 23 are sent from the master device 20 to the server 10 via the return path 25. In addition or as an alternative, event data 23 may be stored within a log file in the master device. Accordingly, sending said event data to the server 10 may be delayed for instance. Event data 23 may be transmitted from the master device to the server 10 within a report message 24 schematically depicted in FIG. 2 by an envelope.

From a leaked digital content, previously marked using the first mark 31, and thanks to such event data 23, it becomes easy to retrace and identify the peripheral device 30 from which this digital content was leaked. Indeed, event data 23 can provide complementary data in addition to the information included with the first mark 31. Therefore, the first mark 31 does not have to be a unique mark that clearly identifies a single peripheral device 30, but it can refer to a mark that identifies a type or a brand of peripheral devices, or even a software version implemented in the peripheral device. Advantageously, a first mark 31 that identifies a group of peripheral devices allows to speed sorting of peripheral devices potentially involved in the leak of the digital content. This makes the investigations more efficient.

Based on such event data 23, this solution can provide valuable details and information on peripheral devices connected to a specific master device. For example, one could identify strange device interconnections or suspicious behaviors. Still as example, it could be also possible to identify temporary exchanges of peripheral devices just before the leak of the digital content.

Third Main Embodiment of the Method

The third main embodiment can be also described on the basis of FIG. 2. This embodiment can be regarded as an extension of the second main embodiment since it further comprises the following features:

A code 13 is generated by the server 10. This code 13 is sent to the master device 20 in response to the event data 23 received by the server 10. For example, this code 13 may be received by the master device within a control message 14 sent via the input link 15.

Then, the master device uses this code 13 for generating the first mark 31. In one embodiment, this code may be used as an additional parameter for generating the first mark 31. According to another embodiment, the code 13 may be used as first mark 31. In this case, the server will establish a relationship between the peripheral identification data 33 and this code 13. This relationship may be the assignment of this code to these peripheral identification data. Such association may be achieved through a record configured to store both the code and the peripheral identification data assigned to this code. Accordingly, several records may be stored in a database within the server.

In a variant, the code 13 may be sent in response to a request sent by the master device 20, for example using the report message 24.

The code 13 may be a random or a pseudo-random number generated by a random generator within the server 10. If necessary, the length of the code may be shortened by applying a hash function to the random number or to any number from which this code is derived.

Through the use of this code, peripheral identification data (or the relevant part of this peripheral identification data) are advantageously masked or scrambled within the first mark 31 so that there is no obvious relationship between the peripheral identification data (e.g. an ID or a serial number) of the peripheral device and the content of first mark 31.

Further Embodiments

The following part discloses many embodiments which are each applicable to at least one of the above main embodiments. Furthermore, it should be noted that these embodiments can be also combined with each other in all possible ways, unless the combination provides features which are noticeably incompatible.

In one embodiment, event data 23 may be generated each time the peripheral identification data 33 are received by the master device 20 from the peripheral device 30 and/or each time the peripheral device is disconnected from the master device 20. For example, peripheral identification data 33 may be received by the master device each time the peripheral device 30 is connected to the master device 20. In variant, peripheral identification data 33 may be received from the peripheral device 30 upon request of the master device 20 or when the connection between these two devices 20, 30 is reset or needs to be re-established.

Regarding event data 23, such data may be sent to the server 10 on request of this server. For example, the server may address a request to the master device 20 through a control message 14 and, upon receipt of this control message, the master device 20 may reply by sending event data 23 using the report message 24.

In some cases, it may be opportune or necessary to collect several times event data 23 at the master device 20, before transmitting this set of data to the server 10. For example, this may optimize the reporting operation of event data by consolidating multiple event reports over a period of time. Such a period of time may be determined in advance, for example by means of setting data or parameter received or updated using a control message 14. Alternatively or in addition, this period of time may be determined by the master device 20 or may be dependent on other events. Such events may refer to a reboot of the master device, a power failure, the connection or disconnection of the peripheral device 30 or a speed change of data transmitted through the local data link 29 for example. On the other hand, if the return path 25 is disabled or is temporarily unavailable, it may necessary to store event data 23 within the master device 20 at least until the return path is available again. Storing event data 23 may be achieved using a memory, preferably a secure memory, and/or using cryptographic means for storing these data in an encrypted form.

In the case where the event data 23 are stored, for example within a log file for delaying the transmission of these data to the server, such event data or log file may then be sent to the server on a periodical basis, on request of the server (e.g. through a control message 14) or once a predefined number of event data 23 has been stored in the log file.

Adding a Second Mark

Without departing from the nature of the embodiments mentioned in the preamble of the previous part, another embodiment intends to suggest the following features:

A second mark 22 may be generated by the master device 20. This second mark 22 is derived from the master device identifier 26 or at least from this identifier. Preferably, the second mark 22 corresponds to the master device identifier 26. As shown in FIG. 1 or 2, the second mark 22 is assigned to the master device 20 and is distinct from the first mark 31 assigned to the peripheral device 30. According to this embodiment, the second mark 22 is further included in the watermarking operation performed by the master device. One of the positive aspects of adding such a second mark is that a direct relationship between the master device and the peripheral device can be established through the first and the second mark.

The first mark 31 and the second mark 22 may be used one after the other during the same watermarking process. For example, the two marks 31, 22 may be applied to the digital content 11 immediately one after the other. Thus, the two marks can be inserted almost simultaneously in two sequential insertion steps. This solution differs from the current known processes in which a first mark is applied, then the content is transferred to another device before applying a second mark to this content. In another embodiment, the two marks may overlap each other without destroying themselves.

According to another embodiment, the watermarking step may be repeated several times at different locations in the digital content before transmitting this digital content to the peripheral device. This embodiment is applicable in the aforementioned watermarking step when using only the first mark 31, as well as when using both the first and the second mark. As a result, the digital content 11 will be successively marked with one or two different marks, on at least one portion of this media content or on the entire media content. The repetition of these marks may be performed at regular or irregular intervals (e.g. at random intervals). In one embodiment, the digital content may be watermarked using alternatively the first mark 31 and the second mark 22.

As already mentioned in connection with the first main embodiment, the first mark 31 is generated as a function of at least a part of the peripheral identification data 33. According to one embodiment, this first mark 31 is generated as a function which uses the second mark 22 and the peripheral identification data 33 (or a part of these peripheral identification data 33) as parameters or as operands. For example, this function may be a commutative logical operation, such as an exclusive OR operation (XOR operation) and the operands of this XOR operation may be the second mark 22 and the aforementioned peripheral identification data 33 (or part of these peripheral identification data). Instead of the second mark 22, one may use data from which the second mark is generated. Advantageously, the mark detection time during an analysis process will be not increased.

Additionally or alternatively, this function may be a hash function so as to provide a digest which may be shorter than data used as input of this hash function. Although a hash function is not reversible (i.e. is not possible to recover the input data from the digest using the reverse function), it may be still possible to recover the identifier(s) used as input of such a hash function. Indeed, by using a limited number of identifiers, these latter can be used, one after the other, as input of a same hash function until its digest (output) corresponds to the digest used as watermarking data. Such a limited number of identifiers will reduce the variability of the digests produced by the hash function and can be based on a limited number of device models, software versions or manufacturer identifiers for example.

In one embodiment, peripheral identification data 33 comprise at least a peripheral device identifier 36 and the first mark 31 is derived from this peripheral device identifier 36 or corresponds to this peripheral device identifier.

Identifiers usually have an average length of 48 bits, although they can be of smaller or larger size. If such an identifier is used as a mark for watermarking the digital content, the significant length of this identifier may impact the detection time when trying to retrieve the mark within the digital content. To be detected, an identifier having a long bit length requires more processing time than an identifier having a short bit length. Indeed, it should be noted that retrieving a mark having a 48 bit length may require several days of effort, whereas a mark having 8 or 16 bit length needs few minutes only. For this reason and to optimize the detection time, there is an interest that at least one of the first mark 31 and the second mark 22 is less than 32 bits length, preferably is 16 or 8 bits length.

A short bit length may be obtained by inputting the identifier(s) in a hash function, so as to obtain at least one digest that can then be used as short mark. Due to its short bit length, such a mark will be stronger, namely it will be more resistant to attempts undertaken by malicious persons for erasing the watermark. Advantageously, such a short length does not affect the detection time for dedicated analysis process.

If any, a reverse computation may be performed by using the first mark, or both the first and the second mark, together with already known information obtained by earlier investigations for example. The result of such a reverse computation will reveal the peripheral device identifier as well as the master device identifier if there is a second mark.

Besides, it should be noted that during the detection process aiming to recover the relevant identifier(s), one or both marks may be retrieved. This means that during investigations for identifying the source of the leakage, there is no requirement to retrieve both marks in the digital content. The decision to retrieve the second mark can be taken later, depending on earlier findings about the content leakage.

Furthermore, it should be pointed out that there is no requirement to use marks having the same bit length. For example, the first mark 31 may be a mark of 16 or 8 bits length and the second mark 22 may be longer or shorter. Moreover, in the event the same mark, e.g. the first mark 31, is repeatedly applied to the digital content (e.g. at different locations within this content), these marks can have different bit length even if they relate to the same first mark 31.

Still Further Embodiments

The following embodiments should be considered within the same spirit as those previously disclosed after the main embodiments.

According to another embodiment, the function mentioned above in connection with the main or subsequent embodiments may be defined by the server 10, for example through the control message 14 received by the master device 20. In one embodiment, this function can be included in the control message in the form of a computing code to be executed by the master device for generating the effect of this function. According to another embodiment, the control message 14 may carry an instruction that has to be used by the master device 20 for selecting a relevant function among a plurality of functions preloaded in the master device.

At least one of the peripheral device identifier 36 and master device identifier 26 may relate to a device model number, a unique serial number, a subscriber identification number, a software version implemented in the relevant device, a network address or any value which may contribute in identifying the source of the leakage. These identifiers may be used for identifying a unique device or software, but they may be also used for identifying a group of devices or software for example according to the device type, the software version or a production batch.

Data Exchanges and Data Links

The master device 20 is configured to be connected to the server 10. Such a connection may be a permanent connection, an occasional connection or an intermittent connection. The same is true regarding the local data link 29 connecting the peripheral device 30 to the master device 20. In addition, the local data link 29 may provide a direct connection between these two devices or it may be split for example by an electrical amplifier or any extender device.

In a preferred embodiment, the local data link 29 is a DTCP or an HDMI connection, such as an HDMI cable. Advantageously such a standard enables to receive, from the peripheral device, peripheral identification data 33. For example, such peripheral identification data may be comprised within EDID data (Extended Display Identification Data) carried by the DDC channel (Display Data Channel) which is one of the communication channels of the HDMI standard.

Typically, EDID data includes information relating to the connected peripheral device, such as the manufacturer name, the serial number or the product type. Advantageously, the use of a local data link 29 compliant with the HDMI standard or with any similar standard, allows to take advantage of information that are already present in data exchanged between the peripheral device and the master device. Therefore, the method suggested in the present description can be easily implemented by adapting the interface of the master device 20 and/or by extending the application interfaces (APIs) of this master device. Accordingly, relevant information provided by hardware interfaces that connect the peripheral device to the master device may be exploited according to any of the embodiments disclosed in this description.

In one embodiment, sending the digital content 11 from the master device 20 to the peripheral device 30 may be controlled by the server 10, for example on the basis of the event data 23 received by the server. Therefore, the server 10 may play an active role in data exchanges between the master device and the peripheral device.

Sending the digital content to the peripheral device may depend on a command generated by the server 10 (e.g. within a control message 14) and executed by the master device 20 upon receipt. This command may authorize or prevent the master device to send the digital content 11 to the peripheral device. Moreover, this command may be based on a peripheral device list (black or white list) stored for example in a database and updated by the server and/or by the master device. Preferably, such a database will be located within the server, but it may also be located in the master device.

For example, a black list (i.e. a revocation list) may be used to inventory all the peripheral device identifiers 36 which are known as leaking device or are frequently used by malicious persons for illegal usage of digital content. Accordingly, if the peripheral device identifier 36 is already listed on such a black list, the command will prevent the master device 20 to send the digital content to the peripheral device 30. In other word, the command may depend on whether the peripheral device is identified on such a list or not.

Furthermore, if such a list is updated by the master device, this command may comprise the peripheral device identifier 36 that has to be added or remove from the black list. In any cases the server should be able to control the peripheral device identifiers stored in the database, by keeping the ability to add or to remove any identifier. Thus, if the operator receives complaints from subscribers that are using a legitimate peripheral device identified in the black list, then this list can be amended and further actions may be undertaken to better characterize peripheral devices recognized as illegal devices.

Any data exchanges between the master device 20 and the server 10 may be protected against reading using any means. For example, such a protection may be achieved by using any cryptographic process and/or using a secure channel, in particular for the return path 29. Such a cryptographic process may relate to symmetric or asymmetric encryption schemes involving the use of shared secret key or pairs of private and public keys. Authentication processes using digital signatures and certificates may be also implemented in such data exchanges.

First Main Embodiment of the Device

According to a second aspect, the present solution relates to a device configured to perform any of the embodiments of the above-described method.

More specifically, this device is a master device 20 to transmit a digital content 11 to a peripheral device 30 through a communication interface 215. This master device 20 is located at a user end 2 and is configured to be connected to a server 10 located at a back end 1. By contrast with the "user side", this back end may be regarded as being the "server side", namely the remote area where the server 10 is located. These features have been already disclosed in connection with FIG. 1 and FIG. 2.

Figure 3:
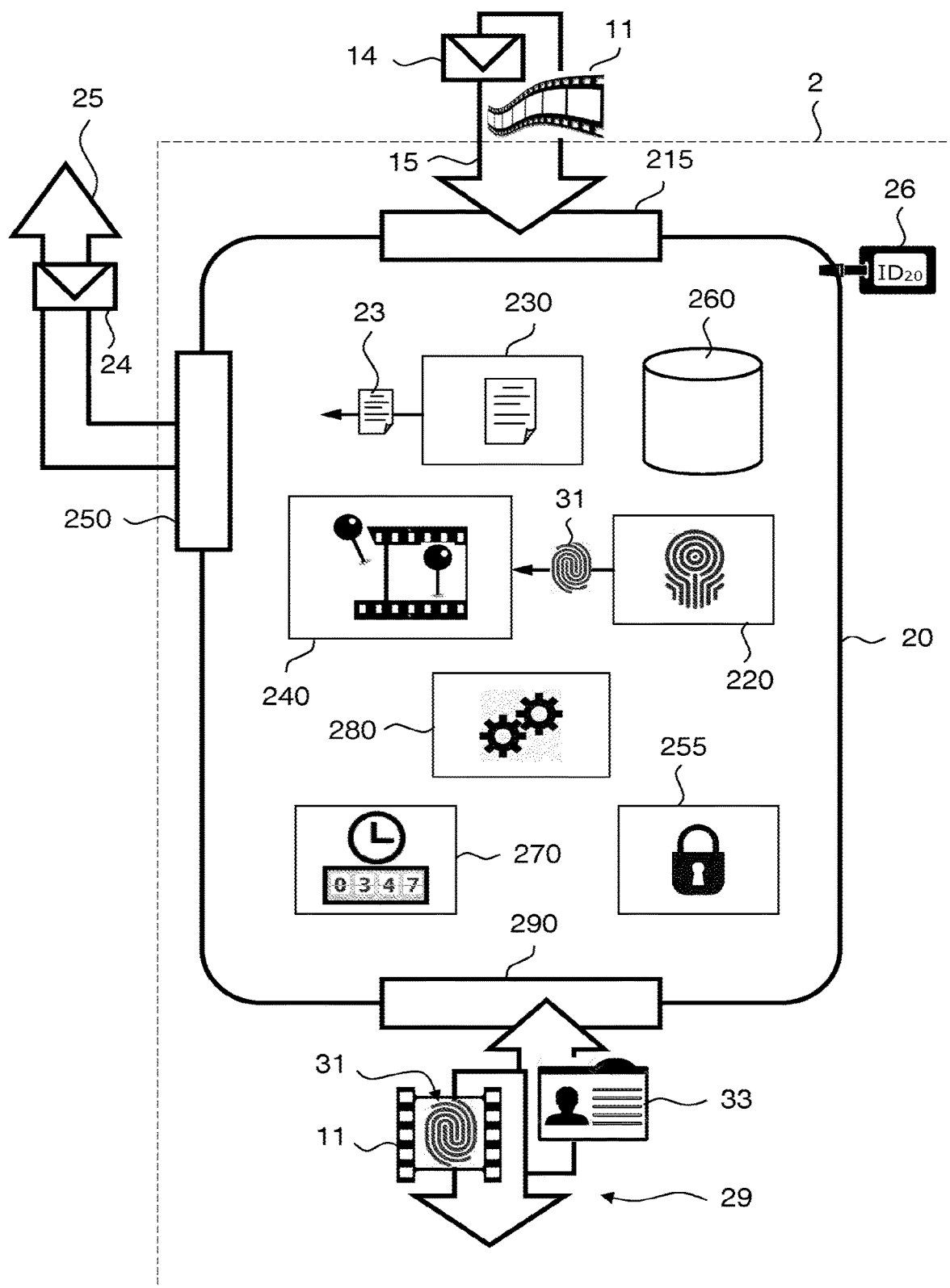
FIG. 3 is a more detailed illustration of a master device shown in the two preceding Figures.

As better shown in FIG. 3, the master device 20 comprises a data interface 290 configured to receive, from said peripheral device 30, at least peripheral identification data 33 pertaining to said peripheral device 30. In accordance with the present solution, the master device 20 further comprises:
- a mark generator 220 configured to generate a first mark 31 as a function of at least a part of the peripheral identification data 33,
- a watermarking unit 240 configured to watermark the digital content 11 using at least the first mark 31, and
- a controller 280 configured to instruct the watermarking unit 240 to watermark the digital content 11, before transmitting the digital content 11 to the peripheral device 30.

As shown in FIG. 3, the watermarking unit 240 and the mark generator 220 are separate entities. However, these two entities may be also located in a single unit. The controller 280 can be regarded as a control processing unit (CPU) responsible for managing at least a part of the units, devices, interfaces or other components of the master device 20. Accordingly, the controller 280 may be also used for managing applications (e.g. APIs) and/or software (firmware) implemented in the master device or in a specific component of this device. Although several interfaces are schematically depicted in the master device of FIG. 3, it should be noted that a single interface may be used instead of two distinct interfaces. This can be achieved without reducing the capabilities provided by each of these distinct interfaces. Similarly, several units, devices or components comprised in the master device 20 may be also put together within one or several bigger entities.

Second Main Embodiment of the Device

According to a second main embodiment, the master device 20 may further comprise a log unit 230 configured to generate event data 23. Such event data comprises at least a master device identifier 26 and at least a part of said peripheral identification data 33. Preferably, event data 23 further comprise information specific to the transaction, for example time reference (e.g. date and time), proof of purchase, transaction number, etc. According to this second main embodiment the master device 20 also comprises a return path interface 250 for linking the master device 20 to the server 10 through a return path 25. Furthermore, the controller 280 is further configured to send the aforementioned event data 23 to the server 10 via the return path 25. This may be achieved using a report message 24 containing event data 23.

Third Main Embodiment of the Device

The third main embodiment can be regarded as an extension of the second main embodiment. According to this third main embodiment, the master device 20 may be further configured to receive, from the server 10, a code 13 in response to the transmission of the event data 23. Furthermore, the master device 20 may be configured to process this code within the watermarking unit 240. To this end, the watermarking unit 240 may be further configured to use this code 13 for generating the first mark 31. The same variants or embodiments as those disclosed in connection with the method may be applied here. The code 13 may be received by the master device 20 through the communication interface 215. For example, this code may be received within a control message 14 sent from the server 10 via the input link 15.

In variant, the code 13 may be sent by the server 10 in response to a request generated and sent by the master device 20, for example using the report message 24.

Further Embodiments

To avoid the repetition of the features already mentioned regarding the above-described method, it should be noted that the master device 20 may be further configured to achieve any embodiment or combination of embodiments among those applicable to the aforementioned method. Accordingly, the master device may further comprise any unit, device or component required for this purpose. For example, the master device may further comprises a memory, preferably a secure memory, and/or a database 260, a counter, a clock and/or a time counting unit 270, a cryptographic processor 255 and any other relevant entity.

Final Considerations

To avoid any misunderstanding, when the present description refers to data suitable to be used as a mark for a watermarking process, it should be understood that such data is more particularly used as payload of this mark (watermark).

Although an overview of the inventive subject matter has been described with reference to specific example embodiments, various modifications and changes may be made to these embodiments without departing from the broader spirit and scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A method for identifying a peripheral device from a digital content having been received by the peripheral device from a master device, the master device being further configured to connect to a server, the method comprising:
receiving, by the master device that sends the digital content to the peripheral device and from the peripheral device that receives the digital content from the master device, at least a peripheral identifier that uniquely identifies the peripheral device that receives the digital content from the master device;
generating, at the master device that sends the digital content to the peripheral device, a first mark as a function of:
the peripheral identifier that uniquely identifies the peripheral device that receives the digital content from the master device,
a master device identifier that uniquely identifies the master device that sends the digital content to the peripheral device, and
transaction information related to the digital content;
watermarking, at the master device that sends the digital content to the peripheral device, the digital content using the first mark before transmitting the digital content to the peripheral device; and
generating, at the master device that sends the digital content to the peripheral device, event data that includes at least the master identifier that uniquely identifies the master device that sends the digital content to the peripheral device, the transaction information related to the digital content, proof of purchase of the digital content, and a date of the transaction information,
wherein the peripheral device that receives the digital content from the master device is separate from and connected to the master device that sends the digital content to the peripheral device through a wired local connection, and the peripheral device that receives the digital content from the master device is a rendering device.

2. The method according to claim 1, further comprising: at least one of:
sending the event data to the server via a return path linking the master device to the server, or
storing the event data in the master device.

3. The method according to claim 2, further comprising:
receiving, at the master device, a code that is generated by the server in response to the event data sent to the server.

4. The method according to claim 2, wherein the event data is at least one of:
generated each time the peripheral identifier is received by the master device from the peripheral device, or
each time the peripheral device is disconnected from the master device.

5. The method according to claim 2, wherein the event data is sent to the server on a periodic basis, on request of the server or once a predefined number of event data has been stored.

6. The method according to claim 1, further comprising generating, at the master device, a second mark as a function of at least the master device identifier,
wherein the watermarking step further includes using the second mark.

7. The method according to claim 6, wherein at least one of the first mark and the second mark is less than 32 bits long.

8. The method according to claim 1, wherein the function is a hash function.

9. The method of claim 2, wherein the function is defined by the server through a control message sent by the server and received by the master device.

10. The method according to claim 2, wherein sending the digital content by the master device to the peripheral device is controlled by the server on the basis of the event data received by the server.

11. The method according to claim 10, wherein sending the digital content by the master device to the peripheral device depends on a command sent by the server and executed by the master device upon receipt, the command authorizing or preventing the master device to send the digital content to the peripheral device.

12. A master device that transmits a digital content to a peripheral device, the master device being separate from the peripheral device and configured to be connected to a server, the master device comprising:
a data interface circuit configured to receive, from the peripheral device that receives the digital content from the master device, at least a peripheral identifier that uniquely identifies the peripheral device that receives the digital content from the master device; and
processing circuitry configured to
generate, at the master device that sends the digital content to the peripheral device, a first mark as a function of:
the peripheral identifier that uniquely identifies the peripheral device that receives the digital content from the master device,
a master device identifier that uniquely identifies the master device that sends the digital content to the peripheral device, and
transaction information related to the digital content;
watermark, at the master device that sends the digital content to the peripheral device, the digital content using the first mark before transmitting the digital content to the peripheral device; and
generate, at the master device that sends the digital content to the peripheral device, event data that includes at least the master identifier that uniquely identifies the master device that sends the digital content to the peripheral device, the transaction information related to the digital content, proof of purchase of the digital content, and a date of the transaction information,
wherein the peripheral device that receives the digital content from the master device is connected to the master device that sends the digital content to the peripheral device through a wired local connection, and the peripheral device that receives the digital content from the master device is a rendering device.

13. The master device according to claim 12, wherein the processing circuitry is further configured to:
send the event data to the server via a return path interface that links the master device to the server device.

14. The master device according to claim 13, wherein the data interface is further configured to receive, from the server, a code that is generated by the server in response to the event data sent to the server.

15. The master device according to claim 13, wherein the processing circuitry is further configured to send the event data to the server on a periodic basis, on request of the server, or once a predefined number of event data has been stored.

16. The master device according to claim 12, wherein the processing circuitry is further configured to generate a second mark as a function of at least the master device identifier, and to use the second mark in watermarking the digital content.

\* \* \* \* \*